(12) United States Patent
Silva Pinto et al.

(10) Patent No.: US 10,706,171 B2
(45) Date of Patent: Jul. 7, 2020

(54) METHOD FOR PROVIDING A SECURE MODE FOR MOBILE DEVICE APPLICATIONS

(71) Applicant: Samsung Eletrônica Da Amazônia Ltda., Campinas (BR)

(72) Inventors: Breno Silva Pinto, Campinas (BR); Felipe Caye Batalha Boeira, Campinas (BR); Pedro Henrique Minatel, Campinas (BR); Brunno Frigo Da Purificação, Campinas (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 225 days.

(21) Appl. No.: 15/167,270

(22) Filed: May 27, 2016

(65) Prior Publication Data

US 2016/0381026 A1 Dec. 29, 2016

(30) Foreign Application Priority Data

Jun. 24, 2015 (BR) .............................. 102015015270

(51) Int. Cl.
*G06F 21/62* (2013.01)
*H04W 12/08* (2009.01)
*G06F 21/53* (2013.01)
*G06F 21/74* (2013.01)
*H04W 88/02* (2009.01)

(52) U.S. Cl.
CPC .......... *G06F 21/6245* (2013.01); *G06F 21/53* (2013.01); *G06F 21/74* (2013.01); *H04W 12/08* (2013.01); *H04W 88/02* (2013.01)

(58) Field of Classification Search
CPC ...... G06F 21/6245; G06F 21/53; G06F 21/74; H04W 12/08; H04W 88/02
USPC .............................................................. 726/4
See application file for complete search history.

(56) References Cited

U.S. PATENT DOCUMENTS

| | | | | |
|---|---|---|---|---|
| 8,479,022 B2 * | 7/2013 | Dahan | ..................... | G06F 21/36 713/194 |
| 8,479,256 B2 * | 7/2013 | van Riel | ................. | G06F 21/53 707/783 |
| 8,612,755 B2 * | 12/2013 | Wray | ..................... | G06F 21/57 713/166 |

(Continued)

*Primary Examiner* — Khang Do
*Assistant Examiner* — Feliciano S Mejia

(57) ABSTRACT

Method for providing a secure mode for mobile applications including: configuring which applications should be available in secure mode; defining in the mobile operating system kernel, rules and privileges for applications defined for the secure mode; checking continuously if the secure mode is enabled by the user; if the security mode is enabled by the user, then the operating system kernel searches all processes and applications running on the operating system, suspend) the system applications not configured to be available in secure mode, hides the protected application, restricts inter-process communications and enforce privilege escalation events and enables access to application files protected by the protected application user Id; and if the security mode is disabled by the user, then the kernel releases all processes and applications that were stopped by the secure mode and denies any access to the protected application files.

8 Claims, 6 Drawing Sheets

(56) References Cited

U.S. PATENT DOCUMENTS

| | | | | |
|---|---|---|---|---|
| 8,909,930 | B2* | 12/2014 | Winslow | H04L 9/3234 |
| | | | | 713/168 |
| 8,949,929 | B2* | 2/2015 | Kelly | G06F 21/53 |
| | | | | 726/1 |
| 9,098,715 | B1* | 8/2015 | Spear, Jr. | G06F 21/604 |
| 9,143,943 | B2* | 9/2015 | Draluk | H04L 63/105 |
| 9,230,076 | B2* | 1/2016 | King | G06F 3/0485 |
| 9,501,638 | B2* | 11/2016 | Hsu | G06F 21/53 |
| 9,565,176 | B2* | 2/2017 | Goyal | H04L 63/12 |
| 9,787,718 | B2* | 10/2017 | Kapoor | G06F 21/51 |
| 10,108,953 | B2* | 10/2018 | Ignatchenko | G06Q 20/3825 |
| 2010/0024028 | A1* | 1/2010 | Baugher | G06F 21/62 |
| | | | | 726/17 |
| 2013/0055378 | A1* | 2/2013 | Chang | G06F 21/53 |
| | | | | 726/17 |
| 2015/0058788 | A1* | 2/2015 | Liu | G06F 21/84 |
| | | | | 715/781 |
| 2015/0067827 | A1* | 3/2015 | Lim | G06F 21/32 |
| | | | | 726/19 |
| 2017/0012981 | A1* | 1/2017 | Obaidi | H04L 63/102 |

* cited by examiner

METHOD FOR PROVIDING A SECURE MODE FOR MOBILE DEVICE APPLICATIONS

CROSS-REFERENCE TO RELATED APPLICATIONS

This application is a U.S. Utility Application, which claims the foreign priority benefit under 35 U.S.C. § 119 of Brazilian Patent Application No. 102015015270-1, filed Jun. 24, 2015, the contents of which are incorporated herein by reference.

FIELD OF THE INVENTION

The present invention refers to a method for providing a new operation mode for mobile devices: a "secure mode" (similar to the "airplane mode" operation, already present in the current smartphones) that adds an additional security layer to protect important user's application (such as bank applications) and sensitive information (e.g., passwords, credit card numbers, bank account information, private photos/videos, etc.).

BACKGROUND OF THE INVENTION

Nowadays, mobile devices (e.g., smartphones, tablets) are increasingly being used to perform sensitive electronic transactions, and also to store a considerable amount of private and confidential information.

While the systems and services offered over transaction mobile devices became more valuable, sophisticated and in widespread use, the incidence of malicious software (malwares) and fraudulent transactions have also increased. There are many security threats associated to mobile devices, which have been successfully hacked, making it possible to a third party (attacker) to fraudulently obtain the user's password and/or any other sensitive information (e.g., credit card numbers, bank account information, private photos/videos, etc.).

Most of current smartphones uses Android Operating System (OS). Therefore, it is understandable why most of malware attacks are driven to Android OS. And it is also well-known that Android Security Model has vulnerabilities. Badly written/coded applications (i.e., a programming fault) may permit a possible attack vector in the inter-application communication, and consequently a malware may achieve unauthorized access to Android application data, but this is not the only reason for Android security vulnerabilities. Besides badly written/coded applications, there are other ways to attack applications and exploit these vulnerabilities if an attacker (cracker) has a "ring0" control or enough access/privileges ("process trace" or "ptrace" is a simple example, where one process can control and manipulate the internal state of another process).

In fact, the increasing number of malware and cyber attacks in the last few years illustrates those Internet and security vulnerabilities on Android operating system: recently, Interpol (International Criminal Police Organization) and Kaspersky Lab (an Internet security software company) conducted the "Mobile Cyber Threats Survey" (published on October 2014), which revealed that more than 588.000 Android users worldwide were attacked by financial malware between August 2013 and July 2014, which is six time greater (600% rise) than the number from the equivalent period 12 months earlier (i.e., August 2012 to July 2013). Additionally, the survey estimates that 98.05% of all existing mobile malware targets the users of Android devices; and only in the first half of year 2014, 175.422 new unique Android malwares were detected. More details can be found on the mentioned "Mobile Cyber Threats Survey", available online at: http://media.kaspersky.com/pdf/Kaspersky-Lab-KSN-Report-mobile-cyberthreats-web.pdf?_ga=1.54425199.671458092.1427292679).

For these and other reasons, one can clearly notice that the vast majority of mobile cyber-threats is driven to Android OS and, unfortunately, attackers still have (undesirable) success rates. Internet vulnerabilities remain a problem in Android devices.

Therefore, there is a need to provide a way to prevent the operation of malwares while critical applications are running, consequently avoiding the fraud/compromising of the transaction, minimizing cyber-threats and the theft of private/confidential information being used by the application during its execution.

Patent document U.S. Pat. No. 7,849,311 B2, titled "Computer System with Dual Operating Modes", published on Dec. 7, 2010, discloses the method and system to create a computer Secure Mode. The described system implements a secure and non-secure file system, then one or another file system is mounted, in order to determine the operation mode. Once the file system is mounted, only the applications present therein will be allowed to execute. In summary, it implements a kind of container that contains applications that will be allowed to run in a specific mode. The drawback of this solution is that the method cannot protect against simple attack of privileged user, since the secure file system can be mounted any time and a malicious application can be embedded/inserted. Additionally, this is not a good solution for non-corporate users, since there is a good chance to have malicious code/software of vulnerable application installed inside the secure mode, making it vulnerable as non-secure mode.

Patent document U.S. Pat. No. 8,499,171 B2, titled "Mobile Security System and Method", published on Jul. 30, 2013, discloses a system and method for providing a secure environment for mobile telephones and other devices. The system and method may use trusting zones, in layered memory, and a secure matrix model having, for example, a memory protection module for protecting memory; a secure debug module for ensuring security of the debug module; a secure file system module for protecting the secure file system; and a trusted time source module for protecting components. This concept is already present in the market as Samsung KNOX solution uses it. The solution disclosed in U.S. Pat. No. 8,499,171 B2 patent is robust, but a special hardware is required, increasing the cost of the product. Additionally, applications in the market must be rewritten to use a special API to be allowed to run in the secure environment, it makes the adoption of such technology very difficult by non-corporate users.

In the current state of art, we have found solutions and technologies that use the concept of containers to create different environments in the same device, isolating groups/clusters of applications. However, existing solutions would not protect the applications inside the container if it is infected by a malware. In fact, if the container is already infected by a malware with high privilege, data interception is possible: for instance, the malware could perform a "memory dump" on the application which is running and manipulating the data (by "ptrace", or in "ring0 control"). In this case, even if the data and/or applications are stored in a container, it is not possible to ensure that it is completely "safe". In other words, as long as the malware can execute/ run/operate in the operating system environment, there is a possible risk of attacking other running applications (whether on a container or not).

Furthermore, existing technologies and solutions fail to improve the security of devices without TrustZone technology. TrustZone technology is tightly integrated into Cortex®-A processors, and is a system-wide approach to security for an array of client and server computing platforms, including handsets, tablets, wearable devices and enterprise systems. The applications provided by the current technology are extremely varied but include payment protection technology, digital rights management, "Bring Your Own Device" (BYOD) and a host of secured enterprise solutions. Non-corporate users do not adopt most of container-based solutions using TrustZone/TEE, such as Samsung MyKnox since most of devices in the market do not support MyKnox. TrustZone/TEE demands higher hardware specifications/requirements (processor, memory, etc.), which restricts the use of this technology only to current flagship/high-end smartphone models. Therefore, there is a need to provide a "lightweight" solution, which is able to improve the security and also can be supported by most of devices.

Another important observation about the use of container-based solutions: sometimes the applications to be used inside the container must be rewritten to use the TrustZone API. It means that even using TrustZone/TEE technology, it is not a guarantee that all important user applications (such as messengers, bank applications, etc.) are protected (unless they are using said API, TrustZone/TEE based solutions fail on really protecting these applications).

It is also important to differentiate the proposed solution from the well-known "application whitelisting" concept. Traditional "application whitelisting" techniques just specify applications to run. That said, these applications can still attack each other (since there is no other security restriction applied to the "application whitelisting").

Differently, the proposed solution of the present invention requires that applications should be pre-approved to execute on "secure mode" and, to produce the desired effect, these applications should also be executed on "Secure Mode" enabled, wherein many security restrictions are applied (it will be further detailed below). That said, even with a group of applications running together on "secure mode", they are protected against each other by security restrictions (it is not true to "application whitelisting" concept).

Therefore, one person skilled in the art can notice that the proposed solution goes beyond the well-known "application whitelisting" concept, by offering not only a way to configure a "pre-approved list of applications to be executed" (in a similar manner of the "whitelist" concept), but additionally providing means to apply security restrictions to these applications.

In this scenario, it is necessary a solution that can be easily used by users in order to avoid cyber-attacks that exploits the existing Android OS security vulnerabilities, aiming to add more resilience into the current operating system, even if it is infected and regardless of whether or not the user is using a container solution.

Our proposed solution will not require hardware modification, application or modification of a new secure file system. The user will use the device as it was originally designed. The application can be installed in the same environment. The new secure mode proposed for mobile will allow users to run only selected critical applications when the mode is enabled and will enforce access permissions when it is disabled. That said, even if the environment is infected, the malware will not be allowed to run and will not be allowed to modify benign files from critical applications, even if secure mode is disabled.

SUMMARY OF THE INVENTION

The present invention refers to a method to protect mobile applications by enforcing a secure operation mode, which adds an additional security layer to protect important/critical user's applications (such as bank applications, messengers, etc.) and sensitive information (e.g., passwords, credit card numbers, bank account information, private photos/videos, text messages, etc.).

Given sufficient information from the application to be protected and from the system, the Operating System (OS) kernel establishes the rules and privileges to these applications, enabling them (and only them) to be executed and performing many security restrictions in a given operation mode of the mobile device, which in the context of the present invention is called "Secure Mode".

The kernel is the central core of an operating system. It has control over everything that happens in the computer or mobile device. It is usually loaded into a protected area of memory, which prevents it from being overwritten by other application programs. For the implementation of the proposed solution, it is required a new kernel module which provides an interface with the Virtual File System, Scheduler and System calls. Modifications in the Android OS user-space components are also necessary.

Since the OS kernel has established the rules and privileges to the chosen/selected applications (i.e., the kernel "knows"—or "was informed by the user"—which are the applications that will be executed on "secure mode"), every time the user switches (enable or disable) the mode of the mobile device operation, the operating system kernel will apply restrictions/stop/suspend or will release restrictions/continue/restart the other applications. More specifically, when the user enables "Secure Mode" of mobile device, the operating system kernel will apply restrictions/stop/suspend all applications that were not previously chosen/selected by the user (including eventual malwares already present in OS environment); analogously, when the user disables "secure mode" of mobile device, the OS kernel will release restrictions/continue/restart of all applications that were stopped/suspended on "secure mode". Additionally many security restrictions (described below) are applied in order to mitigate security risks.

More specifically, the object of the present invention is achieved by a method for providing a secure mode for mobile applications comprising the steps of: configuring which applications should be available in secure mode; setting in the operating system kernel of the mobile, rules and privileges for applications set to the security mode; continually checking if the secure mode is activated by the user; if the security mode is activated by the user, then the operating system kernel looks for processes and applications running on the operating system, suspends system applications not configured to be available in secure mode, hides the protected application, restricts communications between processes, enforces privilege escalation events and allows access to application files protected by the protected application user Id; and if the secure mode is not activated by the user, then the kernel releases all processes and applications that were stopped by the secure mode and denies access to the protected application files.

According to the proposed method, while the "secure mode" is enabled, the eventual existing malwares are not allowed to execute/run/operate in the OS environment (together with all other reliable/known applications that were not previously chosen/selected by the user to run on "secure mode"), thus minimizing the risk of malware attacking critical applications (whether badly written/coded or not; that is, whether it is on a TrustZone container or not).

In order to be executed in "secure mode", the application must be started from a setting panel. The setting panel executes the application and passes its information to the kernel, such as the identification process. Before executing it, the kernel drops any unnecessary and dangerous IPC/Signals from user-space application to the protected application (i.e. "ptrace", "SIGKILL", etc.) and also hides it from user-space. Both actions decrease the risk of attacks/communication with the protected application.

In the next step, the kernel suspends/stops all unnecessary running user-space processes. Additionally, only necessary system processes and the protected application are able to create new processes and execute new binaries. This action reduces the risk of a malware continuing to run from a launch a new malicious process.

Finally, the kernel enforces privilege escalation restrictions during "secure mode", reducing the risk of a malware drops enough privileges to try to bypass all protections.

Additionally, even if "secure mode" is disabled, the kernel will restrict open/read/write operations against critical application's files by unnecessary binaries and processes. Thus, it reduces the risk of malicious modifications by a malware.

The proposed method goes beyond the existing solutions in the prior art, since: (i) it does not require hardware modification or a new secure file system; (ii) it protects the applications running on the operating system environment, even if it is infected by a malware; (iii) it is also able to improve the security of devices without TrustZone (or similar) technology. The present invention differs from existing solutions like virtual machines (VM), containers and TEE (Trust Execution Environment) secure elements.

BRIEF DESCRIPTION OF FIGURES

The objectives and advantages of the present invention will become more clear by means of the following detailed description of a preferred but non-limitative embodiment of the invention, in view of its appended figures, wherein.

DETAILED DESCRIPTION OF THE INVENTION

The method of the present invention provides a new security feature for smartphones, tablets, smart TVs, wearable devices and other smart devices running an operating system (preferably the Android operating system). Therefore, the method for providing a secure mode for of mobile application could be implemented, for example through a kernel update of the Android operating system.

Figure 1:
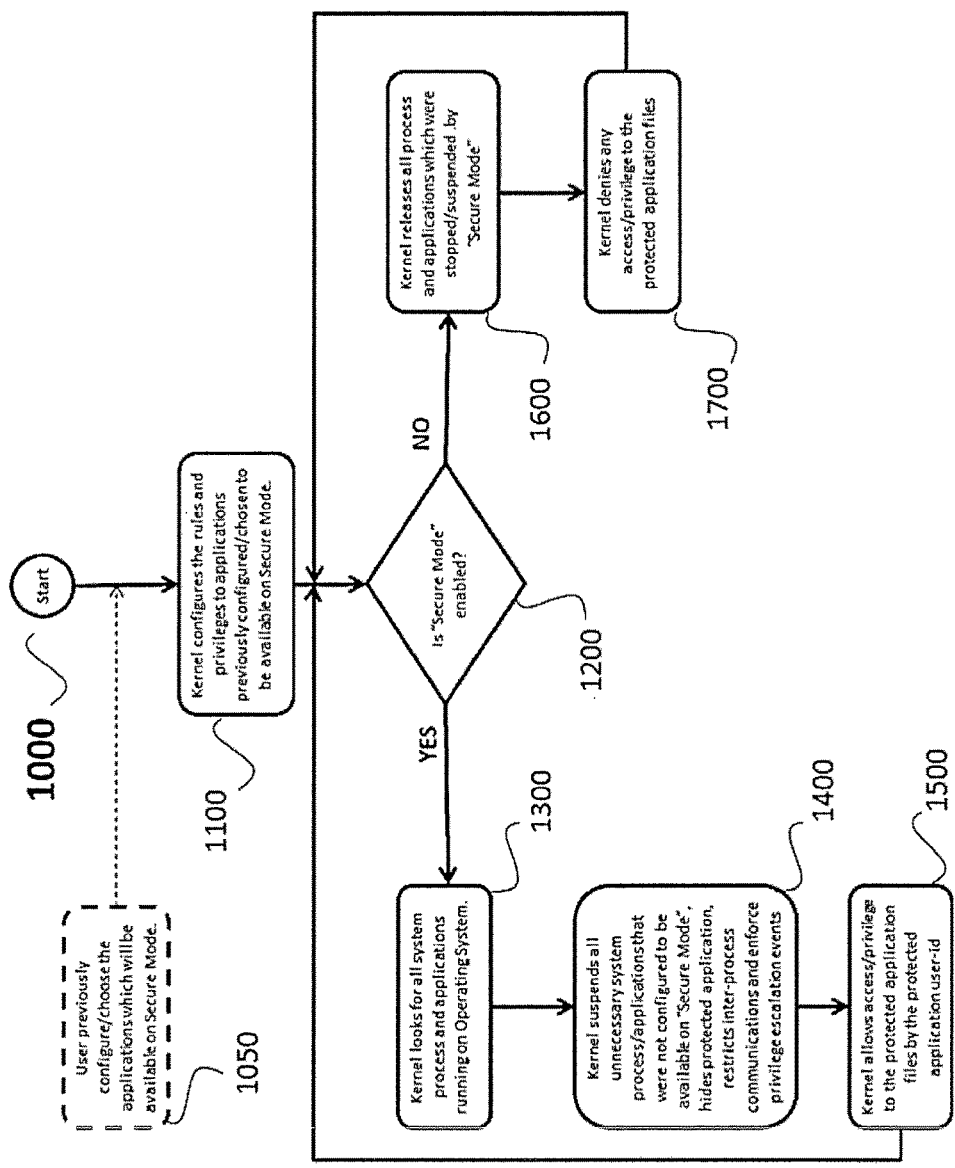
FIG. 1 is a flowchart of the proposed method, which provides a "secure mode" to mobile devices.

FIG. 1 is a flowchart representing each step of the proposed method (1000) disclosed in the present invention.

Initially, the user can previously configure/choose and execute the applications that are available on "secure mode" (step 1050). Generally, on this pre-configuration step, the user chooses those most important/critical applications, which deals with sensitive transactions and private/confidential data. The user in order to add or delete applications to be available on "secure mode" can execute this step/configuration at any time.

After the confirmation of the previous step, the operating system (OS) kernel receives the configuration, only the configuration panel will be allowed to submit it, and establishes the rules once "secure mode" panel executes the protected application (step 1100). The configuration panel sends the application process ID and system binary location (for system processes) to the operating system kernel, and it will be used to select the applications to be run on "secure mode" and to isolate them.

The method continuously checks if the "Secure Mode" was enabled or disabled by the user (step 1200).

If "secure mode" is enabled, the operating system kernel searches for all process and applications currently running on Operating System (step 1300). Kernel threads and only necessary system processes will be available to run together with chosen/selected/configured applications. A list of important system binaries will be submitted to the OS kernel in order to allow system processes in "secure mode".

The operating system kernel suspends all unnecessary system processes/applications that were not configured to be available on "secure mode", hides protected application, restricts inter-process communications and enforces privilege escalation events. Further, only the application executed by the panel and system processes is able to create new processes and execute binaries.

Once the application is started from "secure mode" of mode panel, the OS kernel receives the application ID and (step 1400):

hides the protected application from other user-space applications;

drops any unnecessary IPC/signals from system and application processes (that were not previously configured to be available on "secure mode") to the protected application and important system processes;

refuses new applications to be launched; only protected applications will be able to call them;

enforces privilege escalation events by: (i) refusing user-id modifications from process running inside applications directory; (ii) refusing any binary execution from root processes originated from applications directory (i.e.: /data); (iii) refusing any call to open system calls from root processes originated from applications directory to root system directories (i.e.: /system).

Additionally, the operating system kernel allows access/privilege (open, read, write, run) to the protected application files (step 1500) by the protected application user-id.

If "secure mode" is disabled, the operating system kernel releases/continues/restarts all process/applications which were previously stopped/suspended by the own operating system kernel during "secure mode" (step 1600). For example, the OS kernel could maintain a list of all process/applications that were stopped/suspended on "secure mode" (this would prevent the operating system kernel to eventually release/continue a process/application that was stopped/suspended by another reason). Additionally, the operating system kernel denies any access/privilege (open, read, write, run) to the protected application files and important system processes binaries (step 1700), which adds some protection against data modification even when "secure mode" is disabled.

After the above mentioned protective actions taken by the operating system kernel (steps 1400 and 1500), it becomes very difficult for the malware to establish communication with system processes and protected applications, overwrite of system binaries and application's files, and even being able to execute/run changes its privileges horizontally and vertically, then perform attacks. In fact, in this context where the proposed method 1000 is operating as described above, as far as we know the only way to attempt an attack would be replace/substitute an original system binary by a modified system binary (able to execute the same tasks/instructions of the original one, and additionally execute the malicious code). However, doing this substitution at run-time would damage the system. Besides, the proposed method (1000) would protect system binaries out of secure mode (step 1700), then the attacker would have to access the operating system kernel and somehow disable all these protections.

As described above, the proposed method may be implemented through a new kernel module (patch) on Android operating system, installed/updated on the target devices. Overview of usage/operation of the proposed method to protect mobile devices with "Secure Mode" feature:

For a better understanding of the proposed method 1100, an illustration of its usage/operation is presented according to FIGS. 2 to 7.

Figure 2:
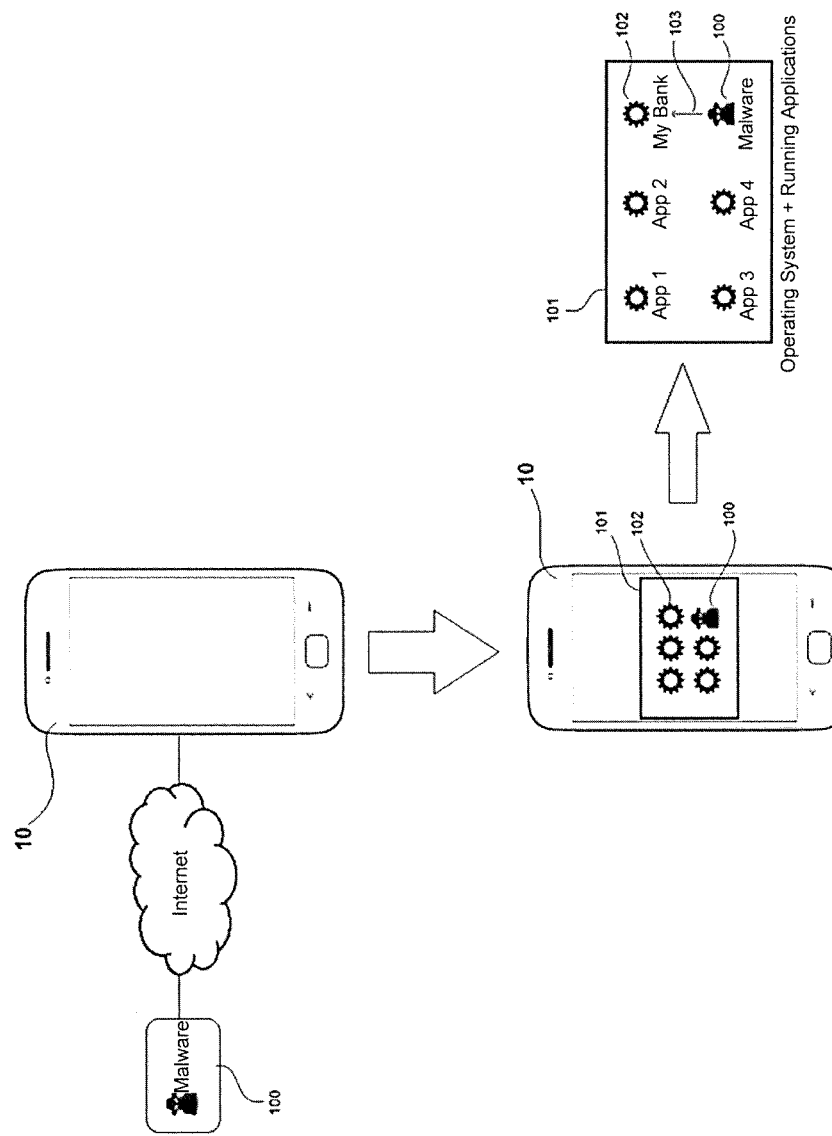
FIG. 2 is a brief illustration of how an attack can be performed against a user application when the mobile device was infected by a malware.

According to FIG. 2, a malicious application or malware 100 can be unwittingly installed by the user during a transaction/download through the Internet, and then compromising the mobile device 10. Often, the malware 100 might be "hidden" inside a "supposedly inoffensive" software application that was installed by the user. After that, the malware 100 would keep running as any other process or application into the operating system 101, waiting for an important application 102 to be launched to attack it 103. A common attack is called man-in-the-middle, wherein the malware 100 intercepts 103 the application 102, trying to modify or steal important data.

In this scenario, when the mobile device 10 is infected by a malware 100 installed in its operating system 101, any user application 102 could be attacked. The present invention proposes an effective solution to this undesirable scenario. Further, it is also an easy-to-use solution. According to FIG. 3, the user can enable or disable the secure operation mode from the mobile home screen, tap and drag the notifications bar downwards, and then press the "secure mode" button/icon 104 [related to step 1200 of the proposed method]. This is exactly the same procedure that users already use to enable or disable the "airplane mode", GPS, Wi-Fi and some other features in the current mobile devices.

Figure 4:
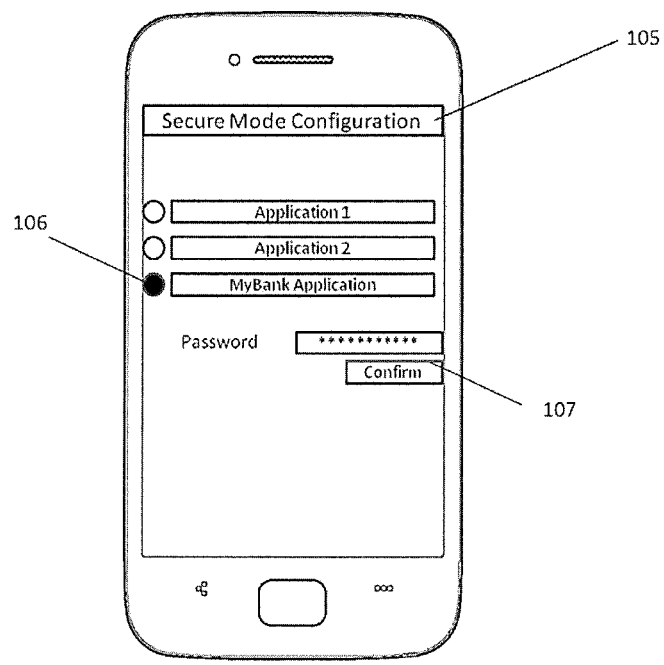
FIG. 4 is a brief illustration of the "secure mode" setting panel.

According to FIG. 4, the user can configure the "secure mode" of operation (which corresponds to step 1050 of the proposed method). There are many possible ways to access the "secure mode" configuration panel 105, for instance: by press and hold the secure mode button/icon 104; or through an extra option in the default configuration panel of the current mobile operating systems. Once in the "secure mode" configuration panel 105, the mobile device switches to secure mode and the user can then select which applications are important to run under Secure Mode 106, for example "MyBank application". After choosing all sensitive applications to be available on "secure mode", then the user enters a password to authenticate and apply/confirm the configuration 107 [Step 1050]. Once the application is executed by the "secure mode", the configuration is sent to the operating system kernel [Step 1100] that will enforce the rules when "secure mode" is enabled: only the chosen and executed applications by the "secure mode" panel, necessary system processes and kernel threads will be available (with privilege) to execute, all other processes and applications will be stopped/suspended/"frozen", IPC/signals restricted, protected application is hidden and privilege modifications are denied [Steps 1300 to 1500]. As mentioned, often the malware (100) might be "hidden" inside a "supposedly inoffensive" software application that was installed by the user, so it is critical to stop/suspend any superfluous/unnecessary application during "secure mode" (for instance, if the user is supposed to use only "Mybank application" while on "secure mode", he/she might ask to stop/suspend all other applications, in order to prevent possible attacks from a malware).

Figure 5:
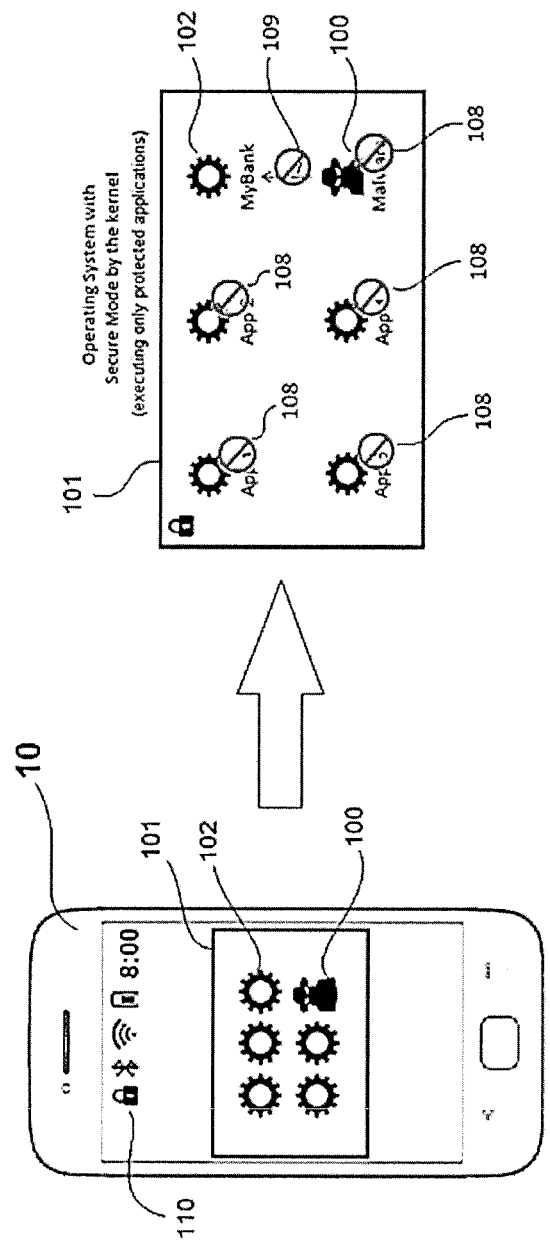
FIG. 5 is a brief illustration of the consequence into the operating system environment when "secure mode" is enabled.

FIG. 5 presents a situation where the "secure mode" was enabled by the user, and so the kernel applies the (preconfigured) rules: all process and applications (e.g., App1, App2, App3, App4, etc.) are stopped/suspended/"frozen" 108 [Steps 1300 and 1400], the exception is "MyBank application" 102 which was previously configured/chosen to execute on "secure mode". For this reason, the operating system kernel will allow access to the files of chosen/protected applications (open, read, write, run) by the protected application user-id [Step 1500]. Additionally any new application is not allowed to be created and any application is not allowed to interact with chosen/protected applications. In this scenario, where the "secure mode" is enabled, even if the mobile device 10 is infected by a malware 100 installed in its operating system 101, the kernel will stop/suspend/"frozen" the malware 100 and it cannot attack 109 the "MyBank application" 102, or any other protected critical application. Preferably, a "secure mode icon" 110 appears on the top notification bar of smartphone screen/display (just like another existing icons, e.g., Bluetooth, Wi-Fi, battery level, etc.) in order to inform the user that "secure mode" is enabled.

Figure 6:
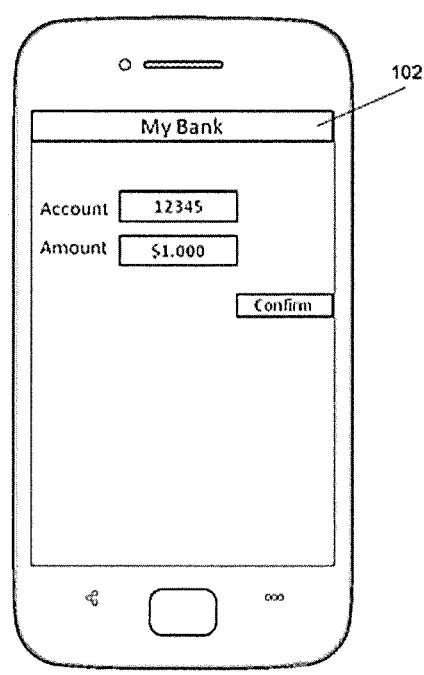
FIG. 6 is a brief illustration of the execution of an important user application in "secure mode".

After enabling the "secure mode" of the mobile device 10, the user now has a secure mode to execute and use the sensitive applications, for instance "MyBank application" 102, as shown in FIG. 6. At this moment, only this application is allowed to run/execute, reducing the risk of attacks against it.

Figure 3:
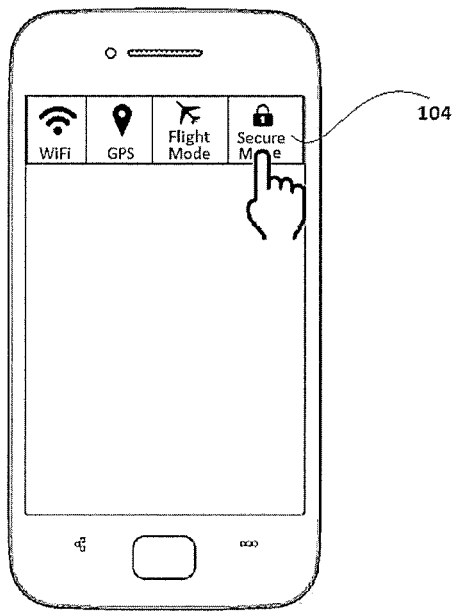
FIG. 3 is a brief illustration of how the user would enable and disable the "secure mode".
Figure 7:
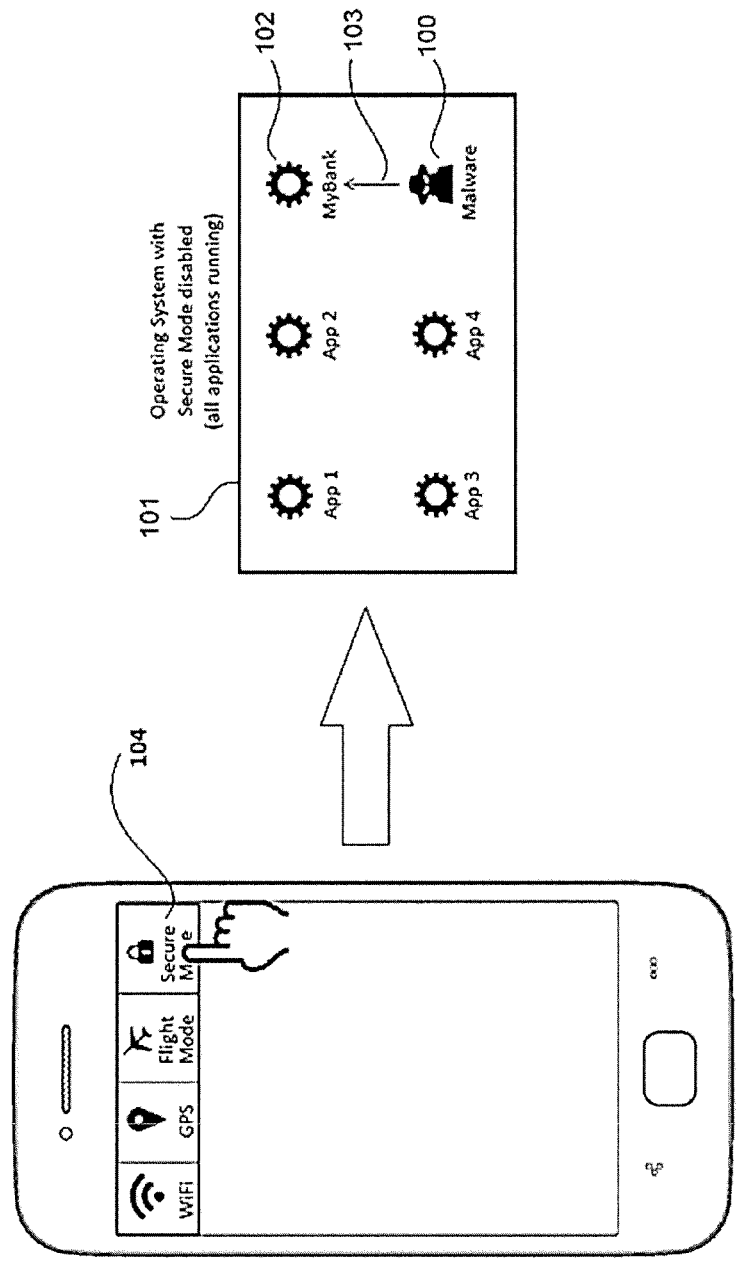
FIG. 7 is a brief illustration of the consequences into the operating system environment when "secure mode" is disabled.

According to FIG. 7, after safely finalize the operation of "MyBank application", the user can disable the "secure mode" by pressing the respective button/icon 104, in the same manner as presented on FIG. 3. Once the "secure mode" is disabled, all applications are released by the operating system kernel [Step 1600]. Additionally, any access (open, read, write, run) to the protected applications' files are denied, which add some protection against data modification when "secure mode" is disabled [Step 1700]. The operating system 101 returns to the normal/default operation mode, in which all process/applications can be executed.

Although the present invention has been described in connection with certain preferred embodiment, it should be understood that it is not intended to limit the invention to those particular embodiment. Rather, it is intended to cover all alternatives, modifications and equivalents possible within the spirit and scope of the invention as defined by the appended claims.

The invention claimed is:

1. A method comprising:
performing, by at least one processor of a mobile apparatus, operations including:
displaying a configuration panel of a secure mode on a display of the mobile apparatus;
receiving, by the displayed configuration panel, a selection of secure applications to be available in the secure mode;
defining, in an operating system kernel of the mobile apparatus, rules and privileges for the selected secure applications available in the secure mode; and
determining whether the secure mode is enabled or disabled by a user selection of a secure mode icon at a top notification bar of the display of the mobile apparatus; and
when the secure mode is determined to be enabled by the user selection of the secure mode icon at the top notification bar of the display of the mobile apparatus:
suspending, on the mobile apparatus, all system applications unnecessary to execute the selected secure applications, and applications other than the selected secure applications,
restricting inter-process communications,
enforcing privilege escalation events, and
enabling access by the user to the selected secure applications while isolating the selected secure applications from the suspended unnecessary system applications and applications other than the selected secure applications; and
when the secure mode is determined to be disabled by the user selection of the secure mode icon at the top notification bar of the display of the mobile apparatus:
releasing all processes and applications suspended in the secure mode, and
denying any access to the selected secure applications.

2. The method of claim 1, wherein the receiving the selection of the secure applications includes receiving the selection of the secure applications from an application list of the mobile apparatus, and receiving a user password to confirm the selected secure applications.

3. The method of claim 1, further comprising changing an image of the secure mode icon at the top notification bar of the display of the mobile apparatus to indicate whether the secure mode is enabled or disabled.

4. The method of claim 1, wherein only system processes necessary to execute the selected secure applications and the selected secure applications create new processes when the secure mode is determined to be enabled.

5. The method of claim 1, the selected secure applications include at least one of password information, credit card information, bank account information, videos, photos, and text messages.

6. The method of claim 1, wherein the mobile apparatus includes at least one of a smart phone, tablet, smart television, and wearable device.

7. A non-transitory computer-readable recording medium storing a program to implement a method comprising:
displaying, by at least one processor of a mobile apparatus, a configuration panel of a secure mode on a display of the mobile apparatus;
receiving, by the displayed configuration panel, a selection of secure applications to be available in the secure mode;
defining, in an operating system kernel of the mobile apparatus, rules and privileges for the selected secure applications available in the secure mode; and
determining, by the at least one processor of a mobile apparatus, whether the secure mode is enabled or disabled by a user selection of a secure mode icon at a top notification bar of the display of the mobile apparatus; and
when the secure mode is determined to be enabled by the user selection of the secure mode icon at the top notification bar of the display of the mobile apparatus:
suspending, on the mobile apparatus, all system applications unnecessary to execute the selected secure applications, and applications other than the selected secure applications,
restricting inter-process communications,
enforcing privilege escalation events, and
enabling access by the user to the selected secure applications while isolating the selected secure applications from the suspended unnecessary system applications and applications other than the selected secure applications; and
when the secure mode is determined to be disabled by the user selection of the secure mode icon at the top notification bar of the display of the mobile apparatus:
releasing all processes and applications suspended in the secure mode, and
denying any access to the selected secure applications.

8. A mobile apparatus comprising:
at least one memory configured to store instructions; and
at least one processor configured to execute the stored instructions to implement a method comprising:
displaying a configuration panel of a secure mode on a display of the mobile apparatus;
receiving, by the displayed configuration panel, a selection of secure applications to be available in the secure mode;
defining, in an operating system kernel of the mobile apparatus, rules and privileges for the selected secure applications available in the secure mode; and
determining whether the secure mode is enabled or disabled by a user selection of a secure mode icon at a top notification bar of the display of the mobile apparatus; and
when the secure mode is determined to be enabled by the user selection of the secure mode icon at the top notification bar of the display of the mobile apparatus:
suspending, on the mobile apparatus, all system applications unnecessary to execute the selected secure applications, and applications other than the selected secure applications,
restricting inter-process communications,
enforcing privilege escalation events, and
enabling access by the user to the selected secure applications while isolating the selected secure applications from the suspended unnecessary system applications and applications other than the selected secure applications; and
when the secure mode is determined to be disabled by the user selection of the secure mode icon at the top notification bar of the display of the mobile apparatus:
releasing all processes and applications suspended in the secure mode, and denying any access to the selected secure applications.

* * * * *

UNITED STATES PATENT AND TRADEMARK OFFICE
CERTIFICATE OF CORRECTION

PATENT NO. : 10,706,171 B2
APPLICATION NO. : 15/167270
DATED : July 7, 2020
INVENTOR(S) : Breno Silva Pinto et al.

It is certified that error appears in the above-identified patent and that said Letters Patent is hereby corrected as shown below:

On the Title Page

Item [73] (Assignee), Line 11:
Delete "ELECTRÔNICA" and insert -- ELETRÔNICA --, therefor.

Signed and Sealed this
Eighth Day of September, 2020

Andrei Iancu
*Director of the United States Patent and Trademark Office*